Dec. 2, 1941.                L. COOPER                2,264,509
                    PROCESS FOR PLASTICIZING RUBBER
                         Filed Feb. 15, 1938
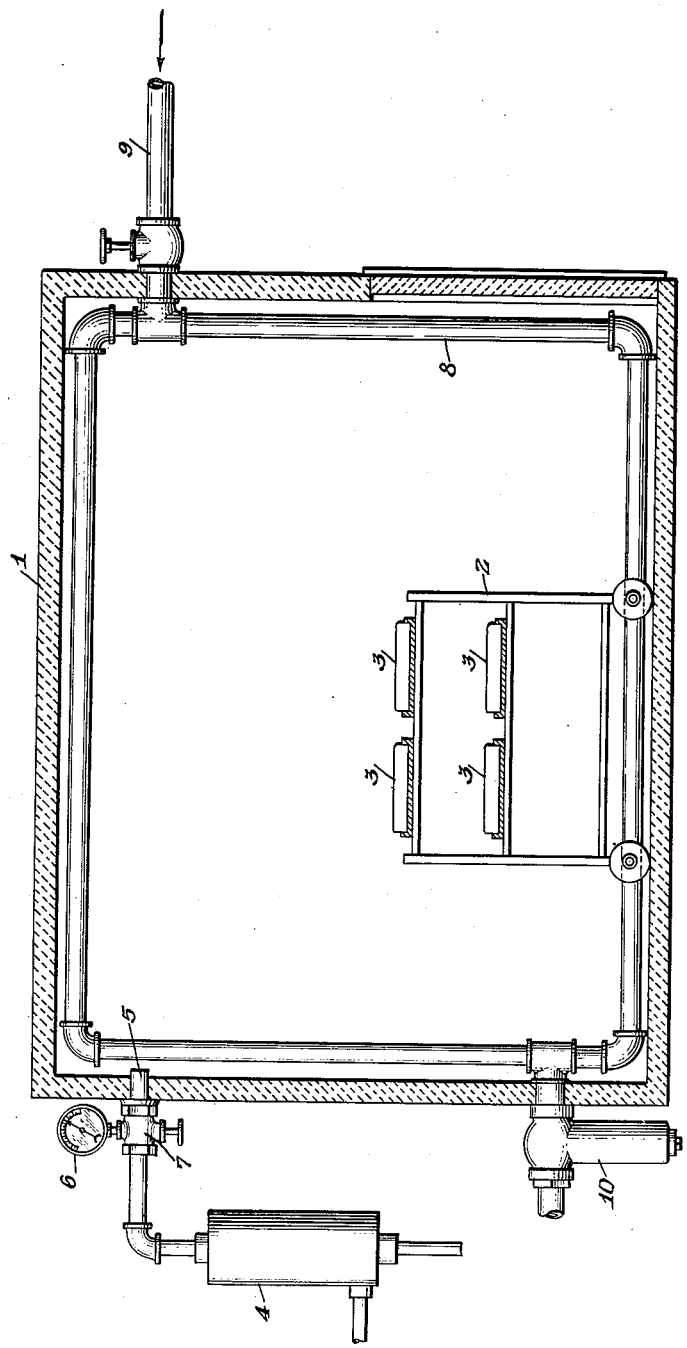
INVENTOR.
Lester Cooper
BY
Ostrolenk, Greene + Marsen
ATTORNEYS Patented Dec. 2, 1941

2,264,509

UNITED STATES PATENT OFFICE 2,264,509

PROCESS FOR PLASTICIZING RUBBER

Lester Cooper, New York, N. Y.

Application February 15, 1938, Serial No. 190,581

2 Claims. (Cl. 260—816)

My invention relates to a novel process for plasticizing crude rubber and more specifically it relates to a process for rapidly producing controlled oxidation of the rubber by impregnation of the rubber with compressed air at elevated temperatures.

Crude rubber to be conditioned for all ordinary purposes must be plasticized in order to have the proper consistency for easy processing and for the necessary finished characteristics. The ordinary manner of plasticizing rubber that has been employed in the past involves the mechanical mastication of rubber in a rubber mill comprising rolls through which the rubber is passed. Banbury mixers, Gordon plasticators and other power driven devices have been used to thoroughly work the rubber. All these are large expensive apparatuses, the cost of which is tremendous and for which costly power sources must be provided. The plasticization of the rubber, however, is absolutely essential in every rubber plant, and up to this time all such rubber plants have employed power equipment to effect the necessary break-down of the rubber to render it fit for use.

In addition to the expensive equipment required and the high cost of the power needed to run the equipment, the process itself is deficient in certain respects. First, it requires constant attendance in that in the ordinary rubber mill an operator must pass the rubber back and forth between the masticating rolls. Further, the plasticized rubber that finally results from the mastication lacked the desired uniformity of plasticity throughout its mass. The process by its very nature produced a final rubber that was more plastic in some parts and less plastic in others, and more particularly, varied from one batch to another.

It has long been recognized that this method of plasticizing rubber was far from desirable, but in spite of many attempts on different lines, no practical commercial method for plasticizing rubber has yet appeared. Rubber mills, Banbury mixers, and Gordon plasticators still break down rubber by masticating in these heavy mechanical mills.

Many attempts have been made to plasticize rubber by oxidizing it. However, such attempts have not met with such success as would enable them to be used to commercial advantage. For example, it has been suggested to oxidize rubber in the presence of water and use elevated temperatures. Using this process, however, it has been impossible to obtain a desirably plasticized uniform rubber. The use of a mixture of air and steam under low pressures has also been suggested, but this method has not proven to give the desirable uniformly plasticized rubber and has further economic disadvantages. The primary disadvantage of these processes has been the difficulty in getting the rubber oxidized below the surface of the rubber where the oxygen bearing gas contacts it, and, secondly, in the loss of time in removing the water from the rubber.

Because it has been found impossible to plasticize the interior of the rubber mass and since therefore a uniformly plasticized rubber cannot be obtained, it has been proposed to form a solution of the rubber in suitable solvents and bubble through the rubber solution an oxygen containing gas. This process produces, of course, a uniformly plasticized rubber solution, but the process itself is so expensive that it is impossible to use it. The disadvantages of this process reside in the necessity for putting the rubber in solution and the recovery of the solvent after the rubber has been plasticized, and the time involved in these operations.

I have found that I can obtain a plasticized rubber that is uniformly plasticized throughout its mass by subjecting crude rubber in a closed chamber to a predetermined amount of air, as for example compressed air under the influence of a predetermined elevated temperature. By employing air under pressure, I secure a penetration of the oxygen of the air in the rubber so that I can obtain the desired uniformity of plasticity.

The use of elevated temperatures makes possible rapid plasticizing of the rubber and by the use of a predetermined amount of air with regard to the predetermined amount of rubber and a regulated temperature, I can obtain a certain desired degree of plasticization. This is important because it is invaluable to be able to predetermine the exact degree of plasticity of the plasticized rubber. According to the present processes, even for given break-down specifications, there is always a question as to just what degree of plasticity has been reached. This is more or less a matter of such variables as room temperatures, equipment temperature, humidity, and human judgment, and uniform results are not always obtained.

According to my process I treat a predetermined quantity of rubber with a gas containing a predetermined amount of available oxygen in a closed chamber so that the pressure of the gas containing the available oxygen is sufficient to penetrate the rubber. The temperature is then elevated so that the action of the available oxygen on the rubber is accelerated and after the available oxygen has been combined with the rubber, a definite plasticity of the rubber is reached.

Another method of my invention comprises heating the crude rubber until it approaches a liquid state and then subjecting this nearly liquid rubber to a gas containing available oxygen. After the rubber has been thoroughly plasticized by means of the oxygen treatment, it may be restored by cooling to its normal solid state.

According to my method, I may not only plasticize the crude rubber to a desirable soft state but I may carry the plasticization further to actually liquefy the rubber.

It is the primary object of my invention to effect a predetermined rubber plasticizing.

It is a further object of my invention to plasticize rubber without the use of mechanical mills or mixers.

It is a further object of my invention to plasticize rubber by the use of a compressed gas containing available oxygen accompanied by elevated temperatures.

It is a further object of my invention to effect a predetermined degree of plasticization of rubber by the use of a predetermined amount of oxygen.

Figure 1 represents a cross section of an autoclave in which the process of my invention may be carried out.

In Figure 1, there is shown an autoclave 1 in which on a stand 2 is placed crude rubber 3. After the autoclave is tightly closed, a predetermined amount of air is pumped in from the pump 4 through the opening 5 in the autoclave 1. The gauge 6 measures the pressure of the air in the chamber so that a predetermined quantity of air may be used. When the proper quantity of air is in the autoclave as shown by the gauge 6, the valve 7 is closed to prevent further entry of air or escape of air already in the chamber. This valve 7 may be manipulated either manually or automatically in accordance with the reading of the gauge 6.

After the predetermined quantity of air is contained in the autoclave 1, the temperature of the autoclave is elevated by means of steam in the steam jacket 8. Steam is brought into the steam jacket 8 by means of the pipe 9 and a steam escape is provided at 10.

I shall now describe a specific method of carrying out my invention. A predetermined quantity of crude rubber 3 of a thickness preferably substantially the order of not more than one-half inch is placed in the autoclave 1 upon the stand 2. Then, in accordance with the speed required in the process, air is admitted to the amount of from 200 to 500 pounds per square inch. If the lower ranges of pressure are employed, a longer period of time is necessary to effect the plasticization of the rubber. These pressures, however, are such that a thorough penetration of the crude rubber by the gas carrying available oxygen, viz. air, is effected. After the desired quantity of air has been introduced into the autoclave, the autoclave is hermetically sealed and the temperature of the autoclave is elevated by introducing steam into the steam jacket 8 until a temperature of from substantially about 212° F. to 400° F. is reached. This temperature effects the combination of the oxygen with the rubber so as to produce the desired plasticization. As in the case of the air the higher the temperature the more accelerated the plasticizing action on the rubber. The temperature is maintained for a period of from 30 minutes to 6 hours in accordance with the degree of plasticization desired and in accordance with the degree of heat employed.

Specifically, I may carry out my process by loading about 2800 pounds of crude rubber in the form of one-half inch sheets held in trays on a truck in an autoclave of 4 feet diameter and 15 feet in length. The autoclave is then closed, and compressed air is forced into the autoclave until a pressure of 300 pounds per square inch is reached. When this pressure has been arrived at, the temperature of the autoclave is raised until it reaches approximately 260° F. The rubber in this manner is subjected to compressed air under pressure at substantially this temperature of 260° F. for a period of about thirty minutes. The compressed air permeates the rubber and effects both the mechanical separation of the fibre of the rubber and the oxidation of the rubber to effect plasticization thereof.

Similarly, other runs for plasticizing crude rubber in accordance with the following data have been effected:

*Stock—pale crepe*

Size of chamber—3 inches in diameter by 12 inches long

|  | 1 | 2 | 3 | 4 | 5 |
|---|---|---|---|---|---|
| Air pressure | 300#/in.² | 300#/in.² | 300#/in.² | 500#/in.² | 500#/in.² |
| Temperature | 218° F. | 218° F. | 218° F. | 218° F. | 218° F. |
| Time | 2 hours | 4 hours | 8 hours | 2 hours | 8 hours. |
| Plasticizing effect | Well plasticized but little discolored. | Softer and more discolored than No. 1. | Very soft and tacky and more discolored than No. 1 or 2. | Not tacky but soft and well plasticized. | Semi-liquid state—very tacky, dark brown in color. |

It is to be noted that the higher the pressure and the higher the temperature, the greater plasticity and softness is obtained. Further the greater oxidizing action effected by pressure and heat causes greater discoloration of the rubber. These samples when tested with the William plastiometer reveal that samples 1, 2 and 3 are progressively softer and similarly, sample 5 is softer than sample 4.

The air pressures recited above are such that a penetration of the crude rubber by the oxygen is well effected. The quantity of air that is to be used is calculated in accordance with the quantity of crude rubber employed and in accordance with the degree of plasticization that is to be effected. Thus the rubber may be plasticized to a slight degree, a soft plastic condition or even to a liquid state. The operator, after a few simple trials with a batch of crude rubber can easily select the specific amount of air, degree of temperature and length of time for the particular plasticizing effect.

As set forth hereinbefore, I may effect the uniform plasticization of crude rubber by heating the crude rubber until it approaches a liquid state, whereupon I cause the rubber to be subjected to a gas containing available oxygen under pressure. When the temperature of the crude rubber is elevated, it softens and the penetration of the oxygen carrying gas is effected more readily. Thus, if I desire to employ a lower gas pressure, I employ higher temperatures. The temperature at which the rubber approaches the liquid state is about 400° F. The gas pressure which I may employ when the rubber is in this near liquid state may be of the order of 200 pounds per square inch.

It is an important factor of my invention that the rubber is to a certain extent plasticized by the pressure of the gas alone without regard to the plasticizing effect of the oxygen upon the rubber. Thus the penetration of the gas into the rubber effects such a separation of the rubber fibres that a certain plasticization is effected in this way alone so that the rubber can more easily be worked. The added effect of the oxygen upon the crude rubber effects a still further plasticization of the rubber in that the oxygen appears to effect a depolymerization of the rubber molecule. Thus, the penetration of the gas under high pressure effects a physical or mechanical separation of the rubber fibres to effect the plasticization of the rubber and the oxygen of the high pressure gas penetrates through the rubber to effect a chemical plasticization of the rubber. My process thus may effect a uniform and homogeneous plasticizing of the rubber by combination of mechanical and chemical action.

The factors which I have recited involving the use of a predetermined quantity of air together with a predetermined quantity of crude rubber accompanied by elevated temperatures, of substantially the ranges recited, under the relatively high pressures to induce thorough penetration of the gas in the rubber, are critical factors in my process. By means of these factors, I can obtain a properly plasticized and uniformly plasticized rubber according to the method that is economically practical.

Although I have described my invention with particular reference to certain ranges set forth, it is to be understood that I wish to cover the thorough and uniform plasticization of rubber according to the principles I have set forth as exemplified by the appended claims.

I claim:

1. The method of uniformly plasticizing rubber which comprises placing crude rubber in a closed chamber, admitting air to the chamber until a pressure on the order of from 200 to 500 pounds per square inch is reached, raising the temperature of the crude rubber to a range of about 212° to 400° F. and maintaining such temperature and pressure for a period substantially of from 30 minutes to 6 hours.

2. The method of uniformly plasticizing rubber to a predetermined plasticity which comprises placing a predetermined amount of crude rubber in a closed chamber, admitting under pressure air until a pressure on the order of 300 pounds per square inch is reached, raising the temperature of the crude rubber to about 260° F. and maintaining such temperature and pressure for about 30 minutes.

LESTER COOPER.